United States Patent [19]
Garner et al.

[11] 3,811,175
[45] May 21, 1974

[54] METHOD OF MAKING A SPLIT MOLD

[75] Inventors: Paul Johnson Garner, Thorpe Bay; Thomas Robert Stephen Collins, Letchworth, both of England

[73] Assignee: Imperial Chemical Industries Limited, London, England

[22] Filed: Oct. 30, 1972

[21] Appl. No.: 301,711

Related U.S. Application Data

[63] Continuation-in-part of Ser. No. 886,690, Dec. 15, 1969, abandoned.

[52] U.S. Cl. ............ 29/464, 29/527.2, 29/DIG. 39, 204/38 E, 249/80, 264/227, 425/DIG. 30
[51] Int. Cl. .............................................. B29c 1/02
[58] Field of Search ................. 204/20, 38 B, 38 E; 425/DIG. 30; 29/DIG. 1, DIG. 39, 527.1, 527.2, 527.3, 464; 264/225, 227; 249/80

[56] References Cited
UNITED STATES PATENTS

| | | |
|---|---|---|
| 1,357,343 | 11/1920 | Novotny .......................... 249/80 |
| 1,834,763 | 12/1931 | Bonsieur ............................ 264/220 |
| 1,935,916 | 11/1933 | Ragsdale ............................ 164/46 X |
| 2,317,597 | 4/1943 | Ford et al. ........................ 425/407 |
| 3,077,647 | 2/1963 | Kugler ................................ 164/19 |

*Primary Examiner*—Charles W. Lanham
*Assistant Examiner*—D. C. Reiley, III
*Attorney, Agent, or Firm*—Cushman, Darby & Cushman

[57] ABSTRACT

A method of making a split mould having two halves for use in injection moulding. The first mold half is made by applying reinforcing material in the space between a metal shell insert and a positioned locating means. The second mould half is made by positioning a second locating means in engagement with the first locating means, engaging the metal shell of the first mould half with a positioned second metal shell insert so that a mould cavity is defined, filling the mould cavity with liquid reinforcing material, and curing the reinforcing material.

11 Claims, 10 Drawing Figures

METHOD OF MAKING A SPLIT MOLD

This application is a continuation-in-part application of Application Ser. No. 886,690 filed Dec. 15, 1969, now abandoned.

The present invention relates to a process for the production of moulds suitable for use in the production of articles from thermoplastic materials. In particular the invention is concerned with moulds for use in injection moulding and to the moulds so produced.

Moulds which are used in injection moulding are generally known as split moulds and are made in two halves each of which is mounted on the platen of a moulding machine. The two mould halves may then be closed together to form a mould cavity into which thermoplastic material may be injected. The mould halves may then be moved away from each other to allow the moulding to be removed. It is therefore important that the mould halves should be capable of being correctly aligned with respect to each other when the mould is closed during each mould cycle. It is also desirable that they are strong enough to withstand the forces due to the impact on closing the mould halves together and also to withstand the pressures set up by the injection of the thermoplastic materials into the mould.

According to the present invention we provide a process for making a split mould having a first and a second mould half comprising positioning first locating means in spaced relationship to an insert comprising a metal shell which provides the moulding surface of part of the mould cavity, and applying reinforcing material to said insert whereby a first mould half comprising said insert held in spaced relationship to said locating means by said reinforcing material is produced, positioning second locating means in engagement with said first locating means and positioning a second insert comprising a metal shell which provides the moulding surface of the rest of the mould cavity in engagement with the metal shell of the first mould half so as to define the mould cavity, and curing a reinforcing material interposed in liquid from between said second insert and said second locating means whereby a second mould half comprising said second insert held in spaced relationship to said second locating means by said reinforcing material is produced.

The present invention also provides moulds whenever made by this process.

By the term insert we mean either a metal shell without any reinforcing backing, or, more preferably, a metal shell having an initial reinforcing backing to enable it to be handled without danger of distortion or breakage.

It is to be understood that the second insert may be positioned in engagement with the metal shell of the first mould half to define the mould cavity before, during, or after the second locating means is engaged with the first locating means.

The shells of metal may most conveniently be formed around a model of the article to be moulded which may be made in any required manner and may be of any suitable material providing it is not adversely affected during the steps of the present invention. The model may be made of wood, metal, plaster, synthetic thermoplastic, thermosetting resins, rubber especially silicone rubber, wax, plasticine clay or glass reinforced polyester resin. We prefer that the model be mounted on a wood or metal base which has angled edges which provides means of keying the sprayed metal coating around the model. The model should preferably contain cooling or heating pipes which should be fixed as close to the surface to be sprayed as possible; we prefer that the pipes are fixed by a suitable filled epoxy resin. When the metal shell is produced by flame spraying we prefer that the model is sprayed with a water soluble release agent such as polyvinyl alcohol before application of the metal. The release agent allows the metal shell to be parted readily from the model when immersed in water and also assists in the satisfactory laying down of the initial coating of the metal.

The metal shell may be formed around the model by electrodeposition, casting of metal, from sheet metal or by metal spraying; for ease of operation we prefer to form the shell by metal spraying. Any metal from which a shell can be formed around the model may be used but we prefer that when the shell is prepared by flame spraying, the metal is zinc. Alternatively if compressed air spraying is used we have found that low melting alloys, particularly bismuth/tin alloys, are suitable. These metals provide true reproductions of the model surface. A flame sprayed shell can be entirely of zinc or a minimum thickness of 0.050 inch of zinc backed by a low carbon steel, copper or aluminium. If metal spraying techniques are used, aluminium is another suitable material and has the added advantage that it is lighter, and is readily sprayed at a high rate. We prefer that the metal shell is at least 1/16 inch thick, more preferably 0.250 inch thick. We prefer that the model on which the metal shell is formed be provided with a lip surrounding the area defining the moulding surface so that the metal shell when formed extends over this lip and is thus keyed to the model. This technique forms the subject of our U.S. Pat. No. 3,638,299. After the formation of the metal shell and preferably before it is removed from the model, pipes, preferably of copper, may be positioned and bent to follow the contours of the metal shell to a pre-determined cooling plan. The pipes are preferably fixed to the metal shell with a metal filled epoxy resin as this adhesive gives good heat exchange. Alternatively the pipes can be tacked in position with metal filled epoxy resin, and then stuck to the shell by spraying them with metal along their entire length. If desired, thermocouples may be stuck on the metal shell, preferably in the same way as the pipes; this has the distinct advantage that they are in close proximity of the mould face.

The metal shell needs careful handling and is liable to distort due to stresses set up during spraying; it is therefore desirable to provide it with an initial reinforcing layer to render it self-supporting before it is removed from the model. Conveniently, therefore, the model with the metal shell therearound may be surrounded by shuttering to form a bolster cavity into which the reinforcing material such as aluminous cement, thermosetting resins or concrete may be cast. For example wood shuttering may be screwed to the baseboard on which the mould is mounted. Steel tie bars may then be bent and fitted to criss-cross the formed box and allowed to protrude each side. The rods serve three purposes; they strengthen the reinforcing material, they provide means for transporting the completed insert and they also tie it into the main reinforcing backing, e.g. a concrete bolster, when applied to the insert. If the metal shell has been produced by flame spraying it is advisable to coat it with an impermeable layer such as water repellent paint before it is backed with concrete. Concrete or aluminous cement may now be cast into the bolster cavity to cover the shell and to encase the cooling pipes whilst leaving their ends exposed. The model should be well vibrated during casting to ensure there are no voids close to the metal shell. When the backing of concrete is cured the reinforced shell can be parted from the model by trimming off the metal protruding over the lip on the model.

This first reinforcing layer provides sufficient reinforcement to enable the shell to be readily transported and also protects the cooling pipes from being knocked away from the shell. However, it is also necessary to provide a second, more substantial, backing to the mould half to enable it to be used in injection moulding. A further advantage of providing the reinforcement in two stages is that any cracks which may appear in the outermost layer will not propagate into the other layers of the mould.

In the process of our invention, the locating means for each mould half are correctly engaged with each other in a position corresponding to the closed mould either before the main reinforcing material for the second mould half has been applied in liquid form to the back of the insert of the second mould half or while the reinforcing material is still in a liquid state.

According to one preferred embodiment of our invention, the process for producing a split mould comprises making the first mould half and then making the second mould half by floating the second insert in a bath of curable reinforcing material provided with said second locating means, engaging the shell of the first mould half with the floating insert so as to define the mould cavity and engaging said first locating means and said second locating means with each other whereby said floating insert is located in the desired position in relation to said second locating means, and allowing the reinforcing material to cure.

According to another preferred embodiment of our invention, the process for making a split mould comprises making the first mould half and then making the second mould half by placing the second insert on top of the first mould half so that the shell of the first mould half engages with the second insert to define the mould cavity and applying said second locating means to said first locating means so that said locating means are in the engaged position, surrounding the second insert with a wall to define a bolster cavity to receive reinforcing material, pouring a curable reinforcing material in liquid form into said bolster cavity, and allowing the reinforcing material to cure.

The locating means of each mould half may, e.g., be the metal shut off faces in the case of a vertical or horizontal flash mould for injection moulding. Preferably, however, the locating means for each mould half comprises or includes one or more metal blocks since such blocks also enable the mould to withstand the impact due to the closing together of the two mould halves. It is preferable that at least two corresponding metal blocks are positioned on each mould half. In such cases the metal blocks may be positioned where they will:

a. take the majority of the machine clamp forces from the reinforcing material so that there is less likelihood of cracking occurring; the faces of the blocks should preferably therefore be accurately machined parallel and the blocks should preferable be of equal length, b. provide convenient positions for fixing dowels to align the two halves of the mould. The dowels can be part of the blocks or bolted on in the form of plates, c. provide positions where eyebolt holes may be drilled and tapped in the blocks for ease of transportation, and d. provide means of bolting or clamping the completed mould onto the injection moulding machine platens.

We prefer that dowels are formed on the metal blocks in one mould half and that holes are formed to receive the dowels in the blocks of the other mould half. Alternatively one or both sets of dowels may be provided with locating guides which ensure that the blocks in the two halves are in contact when the mould is closed.

The metal blocks are conveniently of square section and their size will depend on the moulding machine being used and the size of the moulding being produced.

Our preferred method of applying the main reinforcing material to the shell of the first mould half is to assemble a bolster cavity to receive the material for the intended bolster around the metal shell or insert whose production has already been described. The bolster frame for the bolster cavity, which may be e.g., of wood or metal, should be assembled on a flat surface which is preferably covered with a plastic film to give a good finish to the reinforcing material when it is cast into the bolster cavity, defined e.g., by the bolster frame itself or by shuttering attached to the bolster frame, around the shell; the film also acts as a release agent.

The locating means, e.g., metal blocks, may conveniently be positioned within the bolster frame, e.g., at the corners in the case of metal blocks so that they will be held in place by the reinforcing material.

The shell of the either half of the split mould may be prepared by using the cavity of one of the halves as a spraying cradle to produce the metal shell for the other mould half. An angled beading is preferably fitted around the top of the inverted shell to provide a key for the sprayed metal. Before any metal is sprayed into the cavity a material is deposited on the shell of the cavity insert to the required thickness to define the mould cavity, sheet wax is a particularly suitable material for injection moulds. A tapered hole called the sprue must be formed in a mould wall through which the polymer may be injected into the mould. Conveniently therefore a metal block is positioned on the wax before the metal is sprayed so that the block may be later drilled and reamed to provide the sprue. Metal may then be sprayed to the required thickness on to the wax around the metal block; the pipes already fitted to the cavity insert can now be used to cool the system during spraying. Alternatively a block of metal may be stuck to the back of the shell and a hole drilled through the block and the shell to form the sprue.

Pipes and thermocouples may then be fitted to the second sprayed shell in the same way as for the first mould half. Wooden shuttering together with strengthening rods fixed around the shell and a block of metal positioned to form an extension of the sprue block positioned on the wax which will extend through the concrete to provide the sprue. A first layer of reinforcing material such as concrete or aluminous cement may then be cast around the shell and allowed to cure so that it is self-supporting. The concrete level should be below the top of the metal block. The second mould half may then be parted from the first when the initial reinforcing layer has cured.

As set out above the mould halves must be provided with a pressure resistant backing and provided with means whereby they may be located on a moulding machine. This may be conveniently achieved for each of the mould halves by providing a bolster frame, preferably of steel, which surrounds the initial insert of each mould half, and attaching shuttering to the bolster frame to form a bolster cavity which is filled with reinforcing material, preferably concrete, to form the bolster. The bolster cavity should have walls of sufficient height to support the reinforcing material to the required depth and the locating means, e.g., metal blocks, may be located within the bolster frame, preferable at the corners, where they will be embedded in the reinforcing material. Alternatively the locating means may be secured to the outside of the bolster frame.

It is, of course, essential that the shells of the two mould halves be correctly located with respect to each other in their bolsters and that the locating means are also correctly positioned. We have found that the most convenient method is to first correctly position the insert for one mould half within its reinforcing bolster. This may be achieved by providing supports within the bolster frame at the required height, adding mobile reinforcing material such as concrete to a height above the supports in the bolster frame and lowering the mould half into the concrete where it is allowed to settle until it comes to rest on the supports. The cooling pipes and thermo-couple leads are led away through holes in the walls of the bolster cavity which is finally filled with concrete to surround the mould half insert so as to provide reinforcement when it has cured.

An injection mould is generally positioned on a moulding machine by a locating ring which aligns the mould with the nozzle of the injection unit. Conveniently the locating ring which is generally a metal disc is accurately positioned in the bolster so that it is held in the desired position by the concrete. In a preferred form the locating ring consists of several steel rods fitted to the centre of a cylindrical block and extending radially therefrom so as to distribute any forces exerted by the injection nozzle of the moulding machine on the locating ring over a large area of the reinforcing material.

The insert of the second mould half must then be mounted in its reinforcing material while ensuring at the same time that the two metal shells mate together to leave a mould cavity of the required depth and that the locating means, e.g., metal blocks, mounted in each mould half will correctly cooperate when the mould is closed during the moulding cycle. The insert of the second mould half together with its locating means, e.g., dowel blocks, may conveniently be located within a bolster cavity which is then filled with concrete so that the insert is "floating" on the concrete and is higher than its final required position. The first mould insert in its bolster is then lowered onto the second insert so that the insert is depressed to the required depth in the liquid concrete and is kept in the required orientation by the position of the first mould half. The two mould halves may then be located in the correct position with respect to each other by means of the locating means, e.g., metal blocks at the corners of the bolsters, the blocks in one mould half being provided with dowels and the blocks in the other mould half with holes to receive the dowels so that when the dowels lock with the holes the two mould halves are correctly positioned with respect to each other.

The second mould insert settles down in the concrete to the required depth and the concrete is allowed to set. Finally, the metal blocks defining the line of the sprue must be drilled out to form the channel along with material may be injected into the mould and the mould mounted on the moulding machine.

An alternative method of mounting the second mould insert in its reinforcing material and ensuring that it is located correctly with respect to the second mould half is to mount the second mould insert on top of the first mould half which is in its bolster. The locating means, e.g., metal blocks, which are to form part of the second mould half should then be placed on the blocks already set in the first mould half, to show the depth to which the concrete should be cast around the second shell. Finally the wall for the bolster cavity for the second mould half is positioned around the insert and reinforcing material cast to the required depth. In this alternative method we prefer that a layer of release agent is laid on top of the reinforcing material surrounding the first mould half to prevent the reinforcing material for the second half sticking to that of the first half as it cures.

The present invention is illustrated by reference to the accompanying drawings in which.

Figure 1:
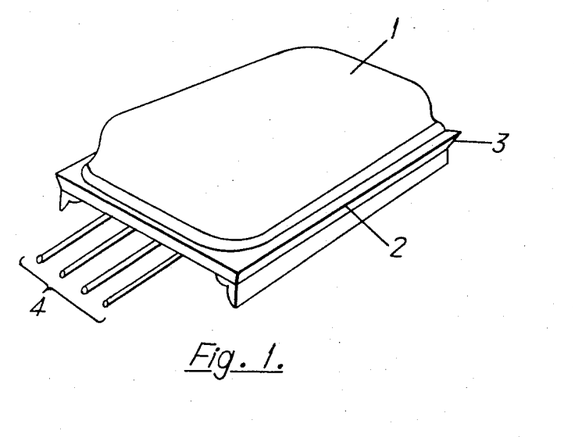
FIG. 1 illustrates the model which is used in the production of the second mould half.
Figure 2:
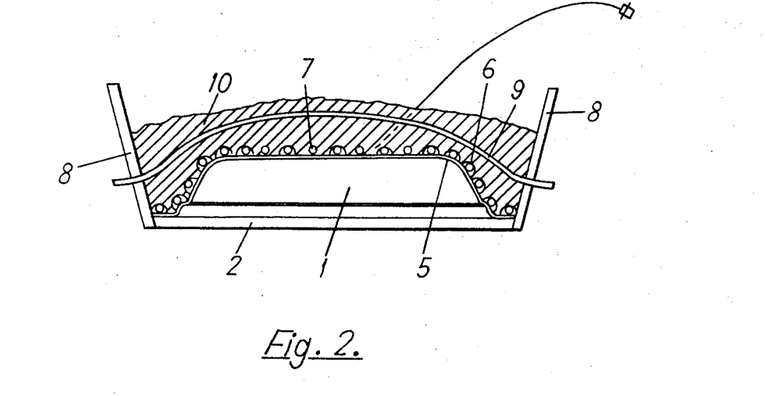
FIG. 2 illustrates the model coated with a metal shell which is provided with an initial rigid backing material.

With respect to FIG. 1 the model 1 is mounted on a wooden base board 2 which has an angled edge 3 which will key to the metal. Cooling pipes 4 are provided at the back of the model to enhance the setting of the sprayed metal coating. As is illustrated in FIG. 2 the model is first spray coated with a layer of metal 5 to which are secured cooling pipes 6 and thermocouples 7. The sprayed model is then surrounded by shuttering 8 and provided with metal keying rods 9 bent to conform to the shape of the model within the shuttering. Aluminous cement 10 is then cast into the shuttering and the insert for the mould half removed from the model when the cement has set and inverted as is shown in FIG. 3 where one may see the mould cavity 11.

Figure 3:
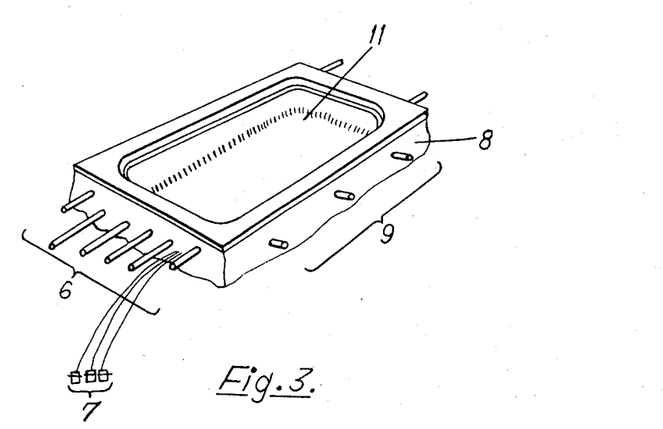
FIG. 3 illustrates the insert for the mould half shown in FIG. 2 removed from the model and inverted.
Figure 4:
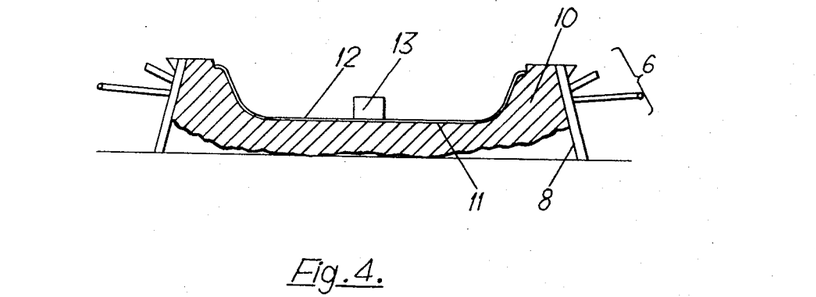
FIG. 4 illustrates the method of using the mould half illustrated in FIG. 3 as a model for the production of the first mould half.
Figure 5:
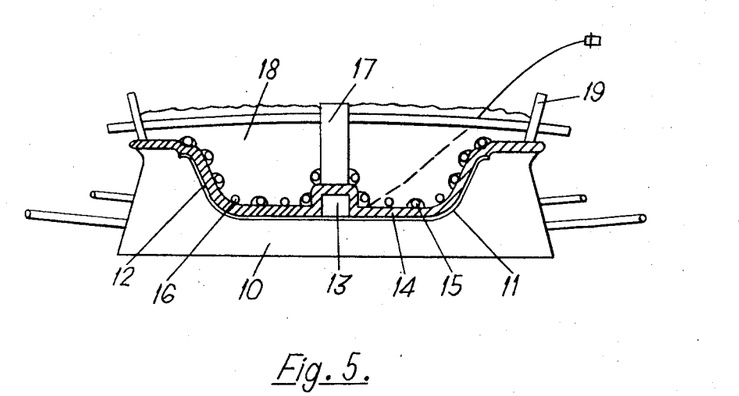
FIG. 5 illustrates the formation of the insert for the first mould half.

The insert for the second mould half illustrated in FIG. 3 is then used as the model for the production of the other mould half as is shown in FIG. 4. The surface 11 of the cavity insert is first coated with a layer of wax 12 to the thickness required for the mould cavity. A metal block 13 is then positioned on top of the wax in the position where the sprue is to be formed in the mould wall. The wax coated mould half is then sprayed with metal 14 to form the shell of the other mould half as is illustrated in FIG. 5; thermocouples and cooling pipes are provided behind shell 14 as is illustrated by 15 and 16. A metal block 17 is also provided behind the block 13 to provide an extension of the sprue. Finally shuttering 19 is placed around the edges of the sprayed metal shell and aluminous cement 18 cast around to back the shell while leaving the end of the metal block 17 exposed. Once the aluminous cement has set the insert for the second mould half may be removed from the insert for the first half as is illustrated in FIG. 6.

Figure 6:
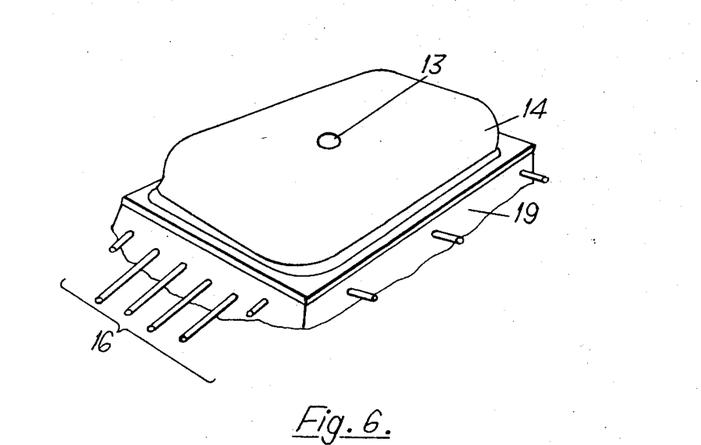
FIG. 6 illustrates the insert for the first mould half removed from that of the second mould half and inverted.
Figure 7:
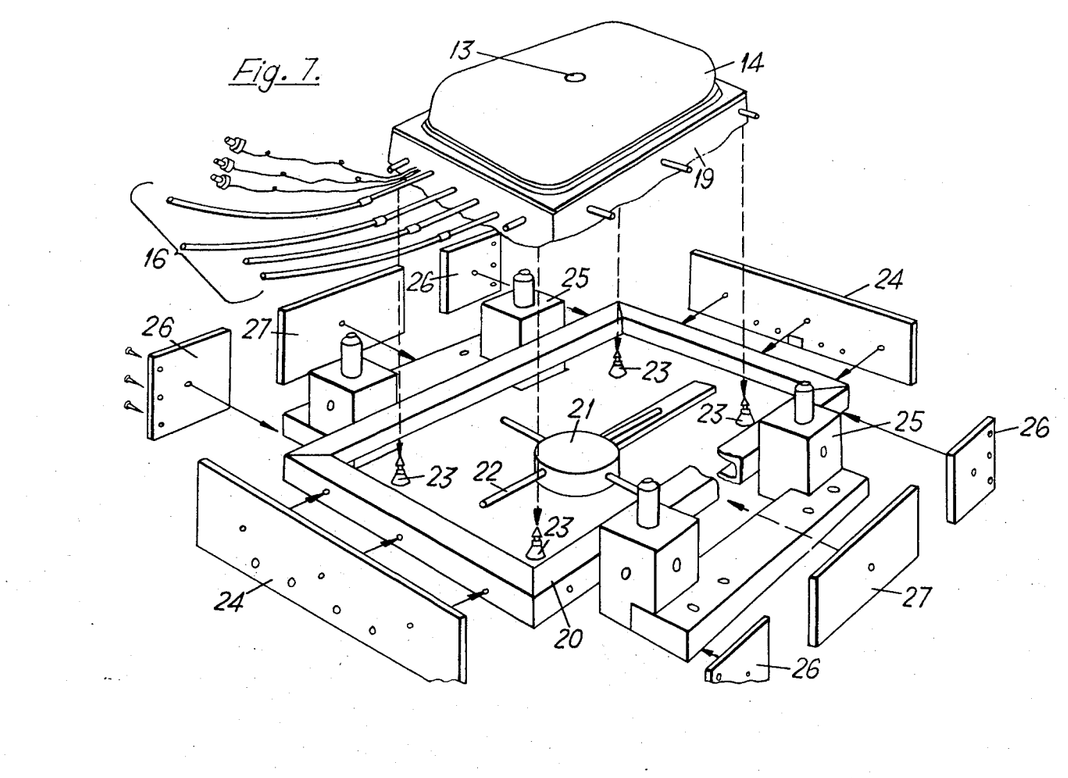
FIG. 7 illustrates a method of locating the insert for the first mould half in its bolster.

FIG. 7 illustrates how the insert for the first mould half shown in FIG. 6 may be located in its bolster. The bolster frame 20 is laid on a flat surface and the locating ring 21 for locating the mould on the moulding machine laid in the centre of the bolster, the ring being provided with arms 22 which will take some of the force. Four adjustable screw jacks 23 are positioned within the bolster frame where they will support the insert for the mould half at its required height within the mould. The bolster frame is first filled with concrete to a depth just above the screw jacks and the mould half lowered into the fluid concrete and allowed to settle down onto the jacks. Shuttering 24, 26 and 27 is then bolted around the edge of the bolster frame in the positions illustrated by the arrows and the metal blocks 25 bolted to the side of the bolster frame in the position illustrated. Concrete may then be cast into the bolster frame around the mould insert.

Figure 8:
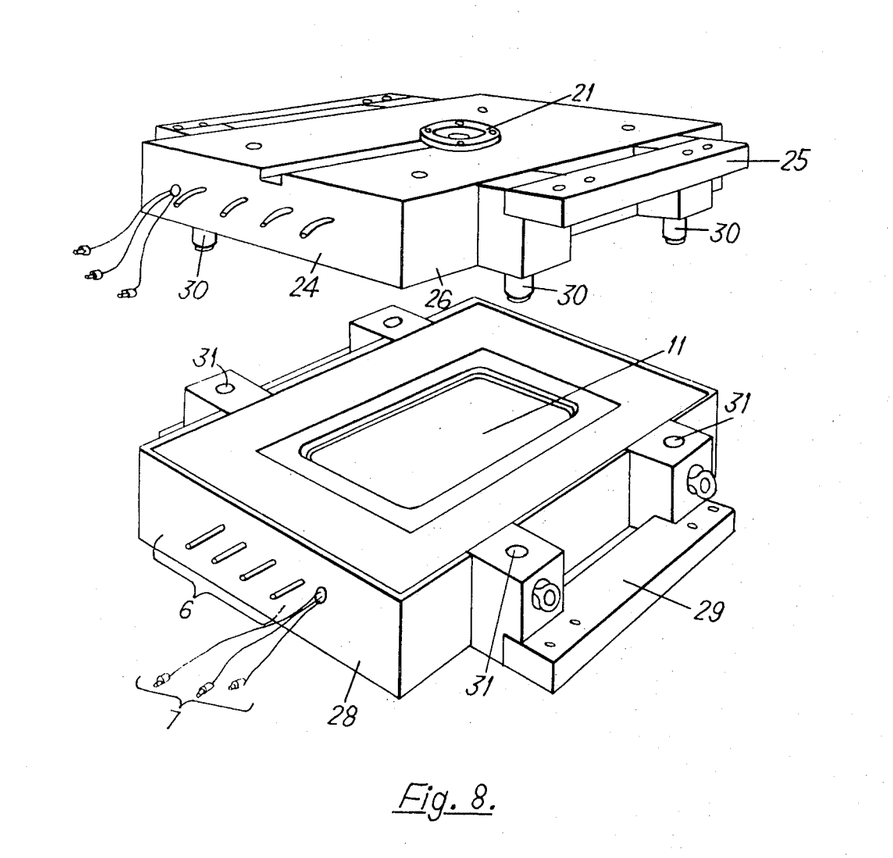
FIG. 8 illustrates the location of the insert for the second mould half in its bolster with respect to the first mould half.

The other mould insert 11 illustrated in FIG. 3 may then be mounted in a bolster frame 28 as shown in FIG. 8. Metal blocks 27 are bolted to the walls of the bolster frame in a position corresponding to the position of the dowels on the bolster of the mould half illustrated in FIG. 7. The mould insert illustrated in FIG. 3 is floated on fluid concrete within the bolster frame 28 and it is located in the correct position in the bolster, with respect to the other mould half by lowering the other mould half onto the mould half 11 as is illustrated in FIG. 8 so that the dowels 30 engage the holes 31 formed in the blocks 27. The mould face 14 will then settle mould half 11 into the concrete. When the concrete has set the mould may be fixed to the moulding machine by means of the platen 29.

Figure 9:
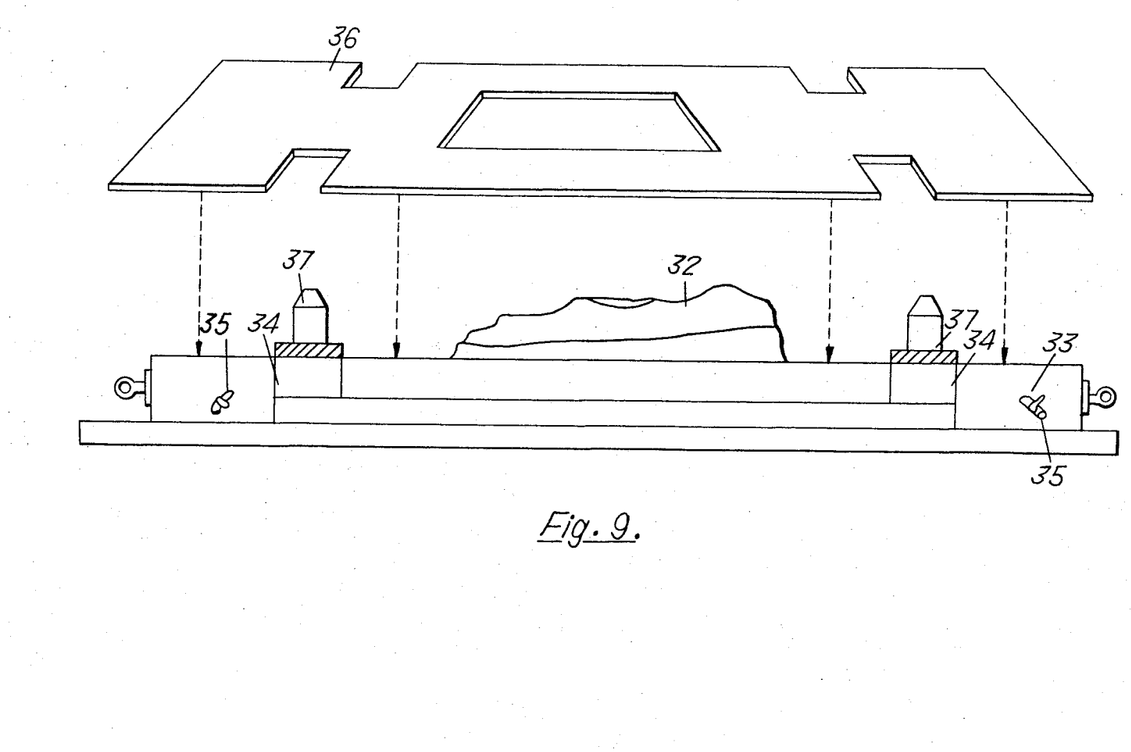
FIGS. 9 and 10 illustrate alternative methods of locating the insert for the second mould half in its bolster with respect to the first mould half.
Figure 10:
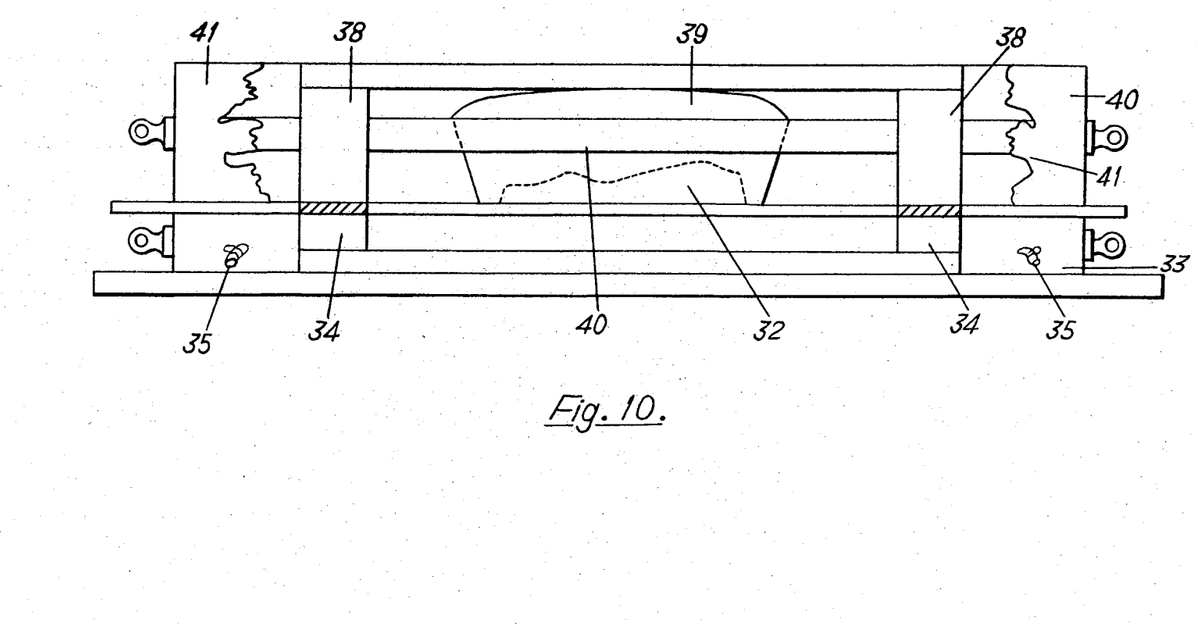

FIGS. 9 and 10 illustrate an alternative method of positioning the insert for the second mould half in its bolster so that it is correctly located.

With reference to FIG. 9 a mould half 32 is shown mounted in its bolster frame 33 with metal blocks 34 mounted at the corners of the bolster frame. Ends of the cooling pipes are shown protruding through the bolster at 35.

In the location of the other mould half with respect to mould half 32 a cut away board 36 is lowered as shown by the arrows so that it rests on the bolster frame 33. The board is suitably cut away so that the dowels 37 mounted on the blocks 34 and the mould half 32 protrude through the board. Referring now to FIG. 10 the blocks 38 which are to form part of the other mould half may be placed so that they mate with the dowels 37. The mould insert 39 is then placed on top of the mould half 32 and the bolster frame 40 together with wood shuttering 41 placed around the mould insert 39 (the wood shuttering 41 is shown partially cut away so that the mould halves may be seen). Mobile reinforcing material such as concrete may then be poured around the mould half insert to a depth equal to the height of the blocks 38 and the concrete smoothed off and allowed to cure.

The board 36 prevents the reinforcing material which is cast around mould insert 39 sticking to the reinforcing material around the mould half 32. Preferably the board either consists of or is coated with a release agent so that it will not stick to the reinforcing material cast around the mould half 32.

We claim:

1. A process for making a split mould having first and second mould halves comprising the steps of:
   1. positioning first locating means in spaced relationship to a metal shell insert which provides a moulding surface of part of the mould cavity;
   2. applying reinforcing material between said insert and said locating means;
   whereby said insert held in spaced relationship to said locating means by said reinforcing material produces a first mould half;
   3. positioning second locating means in engagement with said first locating means;
   positioning a second metal shell insert which provides a moulding surface of the rest of the mould cavity, in engagement with the metal shell of the first mould half so as to define the mould cavity;
   providing a reinforcing material in liquid form between said second insert and said second locating means, and then curing the reinforcing material;
   whereby said second insert held in spaced relationship to said second locating means by said reinforcing material produces a second mould half.

2. A process according to claim 1 wherein the second mould half is produced by floating the second insert in a bath of curable reinforcing material provided with said second locating means;
   engaging the metal shell insert of the first mould half with the floating insert so as to define the mould cavity;
   engaging said first locating means and said second locating means with each other, whereby said floating insert is located in the desired position in relation to said second locating means; and
   allowing the reinforcing material to cure.

3. A process according to claim 1 wherein the second mould half is produced by
   placing the second insert on top of the first mould half so that the shell of the first mould half engages with the second insert to define the mould cavity;
   applying said second locating means to said first locating means so that said locating means are in the engaged position;
   surrounding the second insert with a wall to defined a bolster cavity to receive reinforcing materials;
   pouring a curable reinforcing material in liquid form into said cavity; and
   allowing the reinforcing material to cure.

4. A process according to claim 3 wherein a layer of release agent is deposited on top of the surface of the reinforcing material of the first mould half prior to the pouring of the reinforcing material.

5. A process according to claim 1 wherein said locating means of each mould half is at least one metal block, said metal blocks on engaging during a moulding cycle taking up most of the forces due to the closing of the mould.

6. A process according to claim 5 wherein the at least one metal block of one mould half is provided with a dowel and the at least one metal block of the other mould half is formed with a hole to receive said dowel.

7. A process according to claim 1 when applied to the production of a vertical or horizontal flash mould wherein said locating means are metal shut-off faces therefor.

8. A process according to claim 1 wherein each insert is made by depositing a shell of metal to provide a moulding surface corresponding to part of the mould cavity and applying an initial reinforcing backing to the shell.

9. A process according to claim 1 wherein the metal shell of each mould half is formed by metal spraying onto a model of the article to be moulded.

10. A process according to claim 1 wherein cooling or heating pipes are fixed to the back of the metal shell of each mould half.

11. A process according to claim 1 wherein the moulding surface provided by the metal shell of the first mould half is used as a spraying cradle for the metal shell of the second mould half.

* * * * *

UNITED STATES PATENT OFFICE
CERTIFICATE OF CORRECTION

Patent No. 3,811,175          Dated May 21, 1974

Inventor(s) Paul Johnson Garner et al.

It is certified that error appears in the above-identified patent and that said Letters Patent are hereby corrected as shown below:

Please add the following to the front page format after the application number:

[30] Foreign Application Priority Data

December 30, 1968   Great Britain   61659/68
    and in other countries on subsequent dates Signed and sealed this 5th day of November 1974.

(SEAL)
Attest:

McCOY M. GIBSON JR.          C. MARSHALL DANN
Attesting Officer             Commissioner of Patents